US010574056B1

(12) United States Patent
Wilches Bernal et al.

(10) Patent No.: US 10,574,056 B1
(45) Date of Patent: Feb. 25, 2020

(54) COMMUNICATION ENABLED FAST-ACTING IMBALANCE RESERVE

(71) Applicant: National Technology & Engineering Solutions of Sandia, LLC, Albuquerque, NM (US)

(72) Inventors: Felipe Wilches Bernal, Albuquerque, NM (US); Jason C. Neely, Albuquerque, NM (US); Ricky James Concepcion, Albuquerque, NM (US); Raymond H. Byrne, Albuquerque, NM (US); Abraham Ellis, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 46 days.

(21) Appl. No.: 15/729,334

(22) Filed: Oct. 10, 2017

(51) Int. Cl.
*G05B 15/02* (2006.01)
*H02J 3/28* (2006.01)

(52) U.S. Cl.
CPC ................ *H02J 3/28* (2013.01); *G05B 15/02* (2013.01)

(58) Field of Classification Search
None
See application file for complete search history.

(56) References Cited

U.S. PATENT DOCUMENTS

| | | | | |
|---|---|---|---|---|
| 2002/0143438 | A1* | 10/2002 | Akiyama | H02J 3/008 700/286 |
| 2011/0153098 | A1* | 6/2011 | Tomita | H02J 3/008 700/287 |
| 2013/0338843 | A1* | 12/2013 | Iravani | H02J 4/00 700/295 |
| 2018/0073486 | A1* | 3/2018 | Zhang | F03D 7/0284 |

* cited by examiner

*Primary Examiner* — Thomas C Lee
*Assistant Examiner* — Gary Collins
(74) *Attorney, Agent, or Firm* — Daniel J. Jenkins

(57) ABSTRACT

A system and method for control of dispatchable resources on an electrical power distribution grid is disclosed. The disclosed method provides improved response to power imbalance based on a communications signal independent of system frequency. The communication signal provides a feed-forward control of dispatchable power resources. A communications network is employed to generate a signal to dispatchable resources that a power imbalance has occurred. Due to fast response power transmission network interfaces associated with the dispatchable resources, the respective resources respond in significantly less time than feedback controlled conventional generators which depend on line frequency sensing. The rapid response mitigates the impact of power imbalances and enables greater penetrations of converter-interfaced power generation units such as renewable energy sources to be connected to the grid.

20 Claims, 3 Drawing Sheets

COMMUNICATION ENABLED FAST-ACTING IMBALANCE RESERVE

STATEMENT REGARDING FEDERALLY SPONSORED RESEARCH OR DEVELOPMENT

The United States Government has rights in this invention pursuant to Contract No. DE-AC04-94AL85000 between the United States Department of Energy and Sandia Corporation, and Contract No. DE-NA0003525 between the United State Department of Energy and National Technology & Engineering Solutions of Sandia, LLC, for the operation of the Sandia National Laboratories.

BACKGROUND OF THE INVENTION

The application generally relates to electrical power transmission networks. The application relates more specifically to power transmission networks, also referred to hereinafter as the grid, with communication enabled power sources for fast response to a load imbalance or generation imbalance on the grid.

Power transmission systems require reserve power sources to maintain system stability and to respond rapidly to large power imbalances such as loss of a power generating unit or a sudden disconnection of load. Traditionally, system frequency is a parameter that is sensed on a power transmission network or grid, to indicate when it may be necessary to switch contingent power reserves onto the grid, e.g., in response to a loss of generation capacity. With increasing penetration of renewable energy systems, and the corresponding reduction in system inertia, the rate of frequency fluctuation has been increasing after an event. As this trend continues, power systems may be unable to successfully recover from a large generator failure or loss of significant electrical load.

Traditionally, the frequency response of a power system is determined by the combined effort provided by the governing action of individual generators. Control is driven by a feedback signal that adjusts the machine power output level based on local frequency measurements. The governor actuation is typically slow as it involves the movement of synchronous rotating machines that have large inertias. Contrary to these slow acting dynamics of synchronous generation, converter interfaced generators, or CIGs, e.g., photovoltaics (PVs) or energy storage systems, can be applied almost instantaneously to adjust power levels.

Alternate power resources, e.g., energy storage, PV generation, wind generation, and demand response are becoming more prevalent. Currently, methods of sensing frequency of the power transmission grid to maintain sufficient power generation capacity are inadequate to manage alternate reserve power sources. There is a need to control such alternate resources as fast responding imbalance reserve with improved responsiveness over the traditional approach of sensing system frequency drops.

What is needed is a system and/or method for using a communication signal that provides feed-forward control of dispatchable alternate power sources, where a communications network may be employed to quickly inform dispatchable resources that an imbalance has occurred. Dispatchable power sources refers to resources of electricity that can be dispatched at the request of power grid operators or plants, e.g., power generating plants that can be switched on or off of the grid, or may adjust power output accordingly to a predetermined order. Due to their fast-acting grid interfaces, these resources can respond in significantly less time than feedback controlled conventional generators which need to wait until a change in the grid frequency is detected. Such a communication signal may reduce power system fluctuations and instability, and mitigate the impact of power imbalances, while enabling higher penetrations of converter interfaced units such as renewable energy sources to connect to the grid.

Communication-based methods have been attempted previously to help regulate power system frequency, but such solutions are generally dependent on sensing a frequency deviation and reacting to the sensed deviation, which requires a delayed response.

What is needed is a system or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to an electrical power transmission network. The electrical power transmission network includes one or more primary power generation sources connected to the power transmission network for providing primary power to a plurality of loads connected to the power transmission network. A plurality of secondary generation sources is connected to the power transmission network through switching devices, e.g., power electronics devices or converter. Each of the primary and secondary generation sources includes a sensor module in data communication with a respective generation source. The sensor module senses operating parameters associated with the generation source and modules. The controller receives sensed operating parameters of the primary and secondary generation sources and in response to detecting an imbalance between a power generation capacity and a connected load, communicates a signal to the secondary generation sources and automatically maintains an updated operational state of the power transmission network in balance by redispatching at least one of the secondary generation sources.

Another embodiment relates to a method of controlling a power transmission network. The method includes monitoring a plurality of power generation resources and load on a power grid; detecting an imbalance between power generation resources and load connected to the power network; computing redispatch values associated with the power generation resources connected to the network in response to detecting an imbalance between power generation resources and connected load; communicating redispatch values to respective power generation resources; and monitoring a state of the power generation resources to ensure that the connected power resources have responded to the system redispatch communications.

Still another embodiment relates to a non-transitory computer-readable storage medium having stored thereon instructions which, when executed by one or more processing units, cause the one or more processing units to perform a method of controlling a power transmission network, including monitoring a plurality of power generation resources and load on a power grid; detecting an imbalance between power generation resources and load connected to the power network; computing redispatch values associated with the power generation resources connected to the network in response to detecting an imbalance between power generation resources and connected load; communicating redispatch values to respective power generation resources; and monitoring a state of the power generation resources to ensure that the connected power resources have responded to the system redispatch communications.

Advantages of the disclosure include a novel feed-forward control method to enable the participation of transmission-level CIGs in a primary frequency response of power systems. The disclosed method dispatches CIGs according to a feed-forward command signal which is constructed through active monitoring of significant power imbalances in the system. Because power imbalances may be predictive of frequency disturbances, this approach enables the system to respond before frequency deviations result in power system problems.

A communication infrastructure is disclosed to implement the method, and to monitor and communicate power imbalances from the locus of occurrence to actuating CIGs.

The present invention discloses novel methods for increasing and managing the level of renewable generation while maintaining grid reliability.

Another advantage is the ability for dispatching imbalance reserves on a power transmission grid using communications instead of sensing and reacting to changes in grid frequency.

Yet another advantage is the ability to communicate with and to control deployment of CIGs to dynamically supplement the system inertial response as significant power imbalances occur.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

A power system control scheme is disclosed with communication enabled—fast acting imbalance reserve power sources, as described below.

Figure 1:
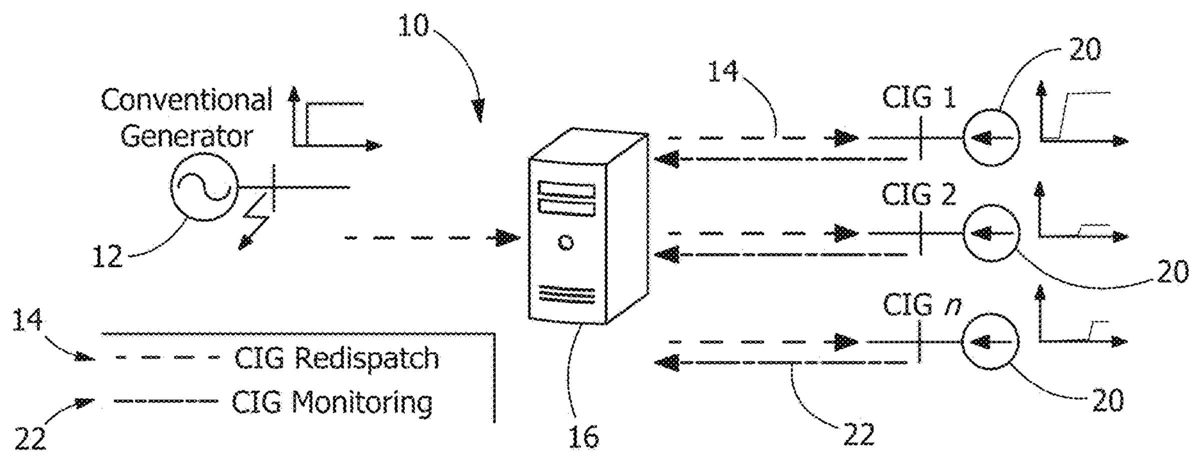
FIG. 1 shows an exemplary power transmission network having renewable and alternate power source as well as a computing resource that monitors the system and communicates with CIGs over a communication network.

Referring to FIG. 1, the implementation of system 10 in a centralized or hybrid architecture is shown. When a power disturbance occurs in system 100 the power imbalance is detected through direct monitoring devices in system 100, e.g., protection schemes in electrical generators or via indirect methods such as power monitoring units, or PMUs 12. Monitoring system 12 transmits a signal 14 to a server, or aggregator, 16. System 100 includes one or more CIGs 20 with redispatching capability to connect each CIG 20, respectively, to system 100 for, e.g., supplemental power. Based on data stored in system 100, aggregator 16 determines a power level required of each CIG in order to mitigate the power imbalance, as discussed in further detail below. Aggregator 16 monitors the parameters associated with each of the CIGs and functions as a controller to maintain an updated operational state of power system 100.

Aggregator 16 initiates communication with all the actuators, or switches, 18 associated with a CIG 20, respectively, as predetermined by aggregator 16 in order to respond to the sensed power imbalance. CIGs 20 begin to adjust their respective power output immediately upon receiving signal 14 from aggregator 16. The adjustment rate in power may be limited by the resource and the power electronics capabilities. Aggregator 16 may take into consideration that CIGs may provide capability above the required responsive power level because CIGs may be operating at reduced load.

When dispatched on to system 100 each CIG 20 receives a power command signal to modify its respective power output as indicated in Equation 1 below:

$$\Delta P_i = K^i_{FF} P_{imb} \qquad \text{Eq. 1}$$

where $P_{imb}$ is the power imbalance determined by the monitoring system. The control scheme is a feed-forward method that employs a communication infrastructure to inform elements of system 100 of a power imbalance in system 100. An element in defining how much each CIG participates is $K^i_{FF}$, defined in Eq. 2 below:

$$K^i_{FF} = \eta \frac{P_i}{P_{available}}, \text{ with } P_{available} = \sum_{j=1}^{N} P_j \qquad \text{Eq. 2}$$

The feed-forward proportional gain of CIG is indicated as, $K^i_{FF}$. $K^i_{FF}$ is determined by the proportional power $CIG_i$ produces with respect to the total power production of all CIGs 20. $P_j$ is the available power level of the $j^{th}$ device and $\eta$ equals the fraction of the power imbalance that will be replaced by the system action. An $\eta$ value of 1 implies that the CIGs will collectively adjust their power by as much as $P_{imb}$. The computation of $K^i_{FF}$ may be performed by aggregator 16 in the centralized implementation, and communicated to each CIG 20 at the moment they are required to respond. The time elapsed, $T^i_{FF}$, from the moment the event occurs and the moment a particular CIG responds is an important factor for the performance of the feed-forward control scheme.

An exemplary embodiment of a power system 10 may be used to show the efficacy of the disclosed feed-forward control scheme described above. The exemplary embodiment includes 20910 buses, 3033 generators and a total generation of 178 GW. Around 40 GW of power being produced by conventional generators is replaced by a developed model for a CIG. In total, 216 conventional machines were substituted by CIGs for an additional penetration of ~23% (the model already contains installations of wind and solar). The CIG model corresponds to a power dispatchable, controllable current source with a first-order approximation for the inverter. The disturbance for this analysis is the loss of a large generating station unit, which corresponds to a loss of 1.15 GW occurring at 2 s. For this event, CE-FAIR was tested for $\eta$=35% and 100%, and 5 different actuation latencies ($T_{FF}$=0, 0.25, 0.5, 1 and 2 seconds) which are kept constant for all CIGs in the system. Two additional cases, one where there are no CIGs in the system (No CIG), and another where the CIGs are uncontrolled and hence unresponsive to frequency fluctuations (No Control), are also considered. The simulations for this example were performed using the GE Positive Sequence Load Flow (PSLF) platform.

Figure 2:
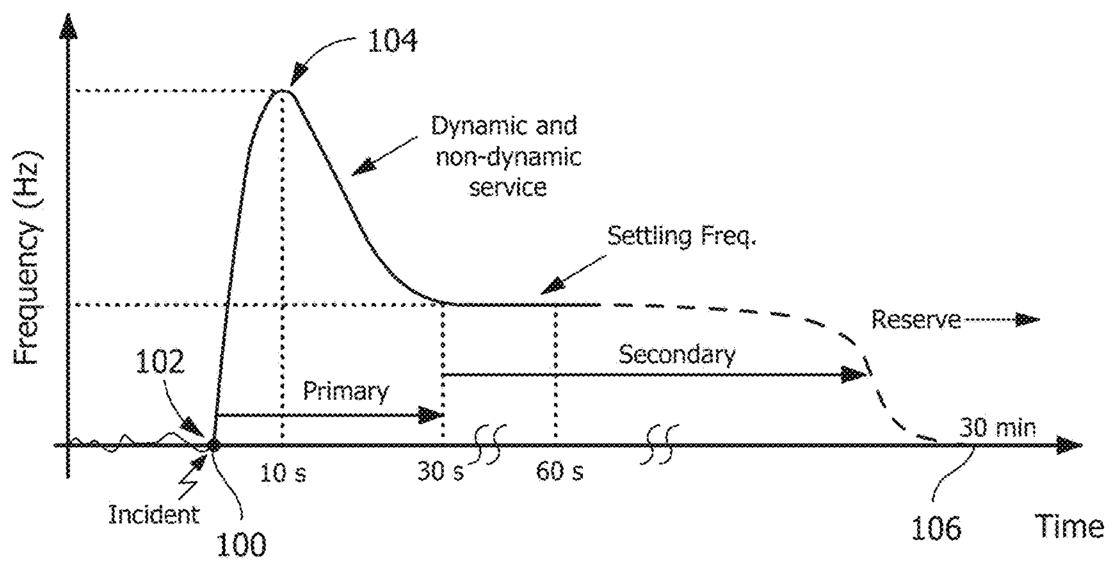
FIG. 2 shows a power system response to a loss of load.
Figure 3:
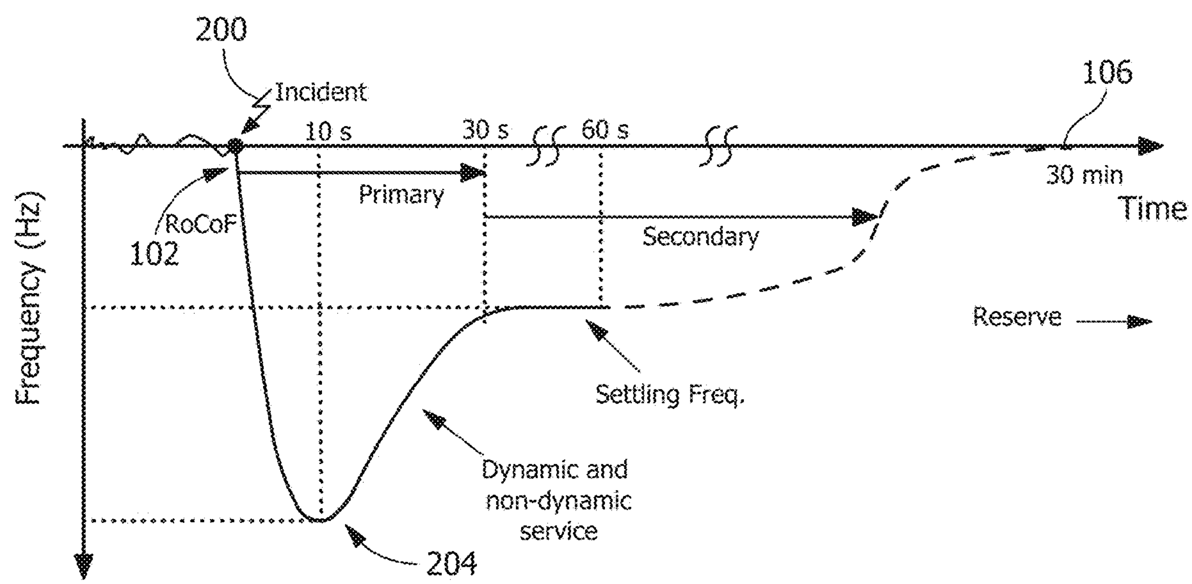
FIG. 3 shows a power system response to a sudden decrease in generating capacity.

Referring next to FIGS. 2 and 3, frequency response of a conventional power system for the loss of the CGS unit is shown for all the cases mentioned above. The effects of including communication enabled fast acting imbalance reserve, or CE-FAIR, to the CIG of the system can be summarized as follows: (i) The proposed controller improves both the frequency nadir and the settling frequency of the system. (ii) Increases in the actuation latency are reflected in more pronounced frequency nadirs. The frequency response of the system when CE-FAIR is active is the same as in the no control case for time intervals below the actuation latency value. The communication latency must be less than the time to frequency nadir in order for the scheme to provide a benefit. (iii) Increases in $\eta$ improve both the frequency nadir and the settling frequency. When $\eta$=1, the settling frequency is greater than the nominal line frequency of 60 Hz. Since the new power generation brought online by CIGs is distributed and is, on average, closer to the loads, the system experiences fewer losses than the power lost that was centralized. However, this outcome is dependent on the nature of both the system and the event.

Referring next to FIGS. 2 and 3, change in system frequency of a conventional power system without the benefit of the disclosed communication enabled fast-acting imbalance reserve is shown. System response to a decrease in generating capacity occurring at point 100 (FIG. 2) or in response to loss of load occurring at point 200 (FIG. 3), is illustrated. The initial rate of change 102 is proportional to the system inertia. The greater the system inertia, the slower the initial change in system frequency. Conversely, with less inertia, the faster the initial change in system frequency. Initially, the local controls at conventional generating units start slowly increasing/decreasing the power output of their units based on their sensing of frequency or e.g., generator rotational speed. This increase in the power output is proportional to the change in frequency and eventually will arrest the frequency drop at a point known as the frequency nadir 204. Likewise, for the loss of load the decrease in the power output is proportional to the change in frequency and eventually will arrest the frequency rise at a point known as the frequency zenith 104. From the nadir 204 or zenith the frequency starts slowly recovering due to this primary action mainly carried out by the governors in local controllers of conventional generators. Because governors generate a proportional action, the frequency response overshoot results in a lower or higher level than the steady state, or nominal, frequency. At the nadir or zenith automatic generation control sends a command to dispatchable generation that in combination with deploying contingency reserves online slowly brings the system frequency back to nominal frequency at point 106. This sequence of actions occurs as a result of the drop/rise in system frequency.

As the availability of renewable power generation sources increases, conventional power generation systems have reduced system inertia. The reduced system inertia results in increased rate of change in system frequency, a lower frequency nadir and a higher frequency zenith. The more power generation sources that are connected to the grid, the greater the likelihood of frequency load shedding for power imbalances, as well as system breakups due to large power imbalance events.

The disclosed power transmission network (FIG. 1) employs a communications system and method in combination with rapidly responding resources like energy storage, PV generation, wind generation, and demand response to mitigate the impact of a sudden power imbalance. By using communications, a message or signal sent over a network provides the cue to change generation, rather than waiting for the subsequent drop/rise in system frequency to initiate action. Since contingency reserve typically refers to generation brought on line, and imbalances are identified bidirectionally, the power reserve is classified as CE-FAIR, as described below.

Figure 4:
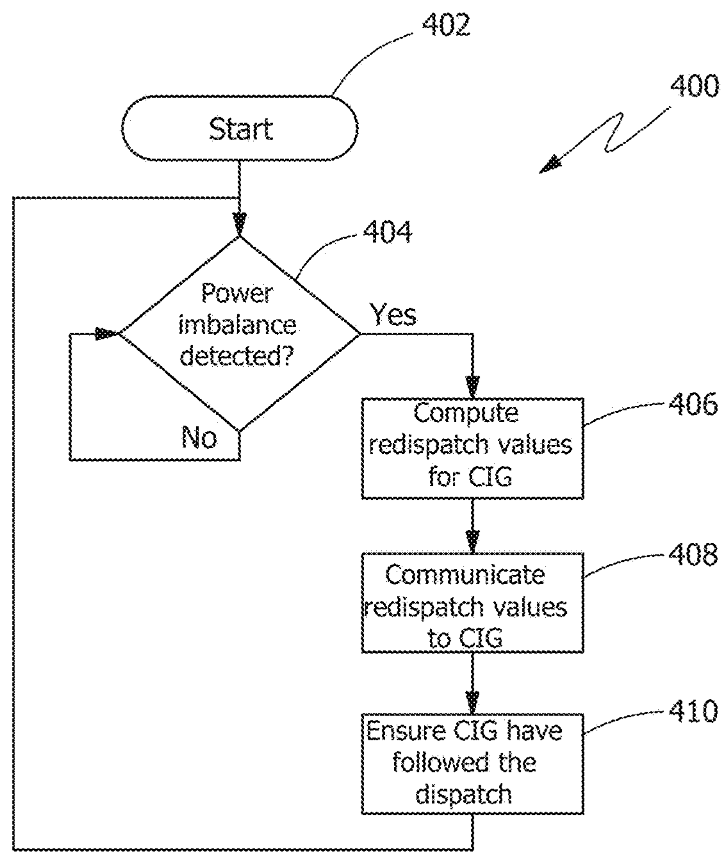
FIG. 4 shows an exemplary flow diagram for a control method of the disclosed embodiments.

Referring next to FIG. 4, an exemplary flow diagram for a control method 400 of the disclosure is shown. From an initial startup 402 of the control method 400, the method 400 proceeds to step 404 continuously monitor power generation resources and load on the power grid, and to detect any imbalance between power resources and load on the power network 100 being managed by method 400. If at step 404 an imbalance is detected, the system proceeds to step 406, to compute redispatch values for all connected CIG 20. After computing all redispatch values for connected CIG, method 400 proceeds to step 408, and communicates redispatch values to respective CIG. From step 408, the method proceeds to step 410, and ensures that the connected CIG have responded to the system redispatch communications by monitoring feedback from CIG 20. The system then returns to step 404 on monitor power resources and detect imbalances.

Given a loss of generation or loss of load estimated at $P_{imbalance}$, wherein the loss quantity may result in positive or negative change in overall system capacity, the amount of power that must be brought online is $P_{imbalance}$ to restore the frequency to its nominal value, without regard to the impact of losses. If there are N dispatchable resources available, with the capability to provide up to $\pm P_i$ change power output the change in power output of each dispatchable resource is given by $$\Delta P_o^i = \eta \frac{P_i}{\sum_{j=1}^{N} P_j} P_{imbalance} : \Delta P_o^i \leq P_i \quad \text{Eq. 3}$$

wherein $\Delta P_o^i$ is subject to the constraints of each resource. If $P_{imbalance}$ is larger than the amount of reserves available, the output of each resource will saturate at the maximum or minimum available output, respectively. Depending on the configuration of the transmission and distribution network, and the location of the dispatchable resources, the losses might be higher or lower than the pre-fault case prior to the generation drop. Therefore, in order to avoid an overshoot in system frequency, it might be desirable to reduce the commanded increase in output power by a scale factor:

$$\Delta P_o^i = \eta \frac{P_i}{\sum_{j=1}^{N} P_j} P_{imbalance}, \Delta P_o^i \leq P_i \quad \text{Eq. 4}$$

The proposed scheme is a feed-forward controller that employs a communication network to communicate power imbalance values, and the commanded change in power at the $i^{th}$ resource is calculated by the produce of a feedforward gain and the power imbalance; the feed-forward gain for the $i^{th}$ resource is given by Equation 5 below:

$$K_{FF}^{i} = \eta \frac{P_i}{\sum_{j=1}^{N} P_j} \quad \text{Eq. 5}$$

Therefore, the sum of the feed-forward terms, i.e., the fraction of the dropped generation that is replaced is equal to $\eta$, which is computed as shown in Equation 6:

$$\sum_{i=1}^{N} K_{FF}^{i} = \eta \quad \text{Eq. 6}$$

The disclosed control scheme greatly improves the transient response of the power system by updating the amount of generation immediately following an imbalance. This is achieved by relying on communications rather than by sensing system frequency and reacting, the approach currently used.

While the exemplary embodiments discussed above disclose a single event, the control scheme may include multiple events. In this case, the total change in output power is the sum of the $\Delta P_o^{\,i}$ calculated for each imbalance event. Assuming that there are K generator drops over some time period, denoted by $P_{kimbalance}$, the increase/decrease in output power of the $i^{th}$ dispatchable resource is given by Equation 7:

$$\Delta P_o^i = \eta \frac{P_i}{\sum_{j=1}^{N} P_j}\left(\sum_{k=1}^{K} P_{imbalance}^{k}\right), \Delta P_o^i \leq \quad \text{Eq. 7}$$

A typical implementation will employ a deadband. Therefore, unless the threshold of the deadband is reached, messaging and subsequent action are not necessary.

The communications enabled contingency reserve scheme can be implemented with multiple control topologies that are discussed below. In one embodiment a distributed control configuration may be employed. In order to implement a distributed control configuration, each resource must have access to the following parameters: all available generation and the amount of available reserve generation for each resource; a message indicating that a generator has been dropped or a large load has been shed from the grid, and the amount of power ($P_{imbalance}$) associated with the lost generation capacity or load; the scale factor which can be system dependent or customized to specific scenarios.

In a distributed control scheme with peer-to-peer communications, each node must periodically broadcast the available reserve generation for that resource. Communication frequency may occur at a lower update rate. Each node must include the desired scale factor. Then, when a generator or large load goes offline, the lost generator or load must broadcast a message that includes the power gained/lost. Upon receiving the message, each resource has all of the information required to calculate the adjusted power level, $\Delta P_{oi}$.

In another embodiment, centralized control may be employed. In this case, a central node, e.g., an independent system operator, tracks the available dispatchable generation by communicating directly with each generator, load and dispatchable resources. If a generator drops or a large load is lost, it communicates data associated with the generator or load to the central node. The central node calculates the change in power level for each dispatchable resource, $\Delta P_{oi}$, and transmits a message to each resource with the commanded change in power.

The centralized control and distributed control methods may be combined in a hybrid control architecture. An exemplary embodiment of a hybrid architecture may include a set of peer nodes that are composed of aggregators. Each aggregator node dispatches the resources assigned to the respective aggregator node to a centralized control scheme, while the peer nodes employ decentralized control.

Figure 5:
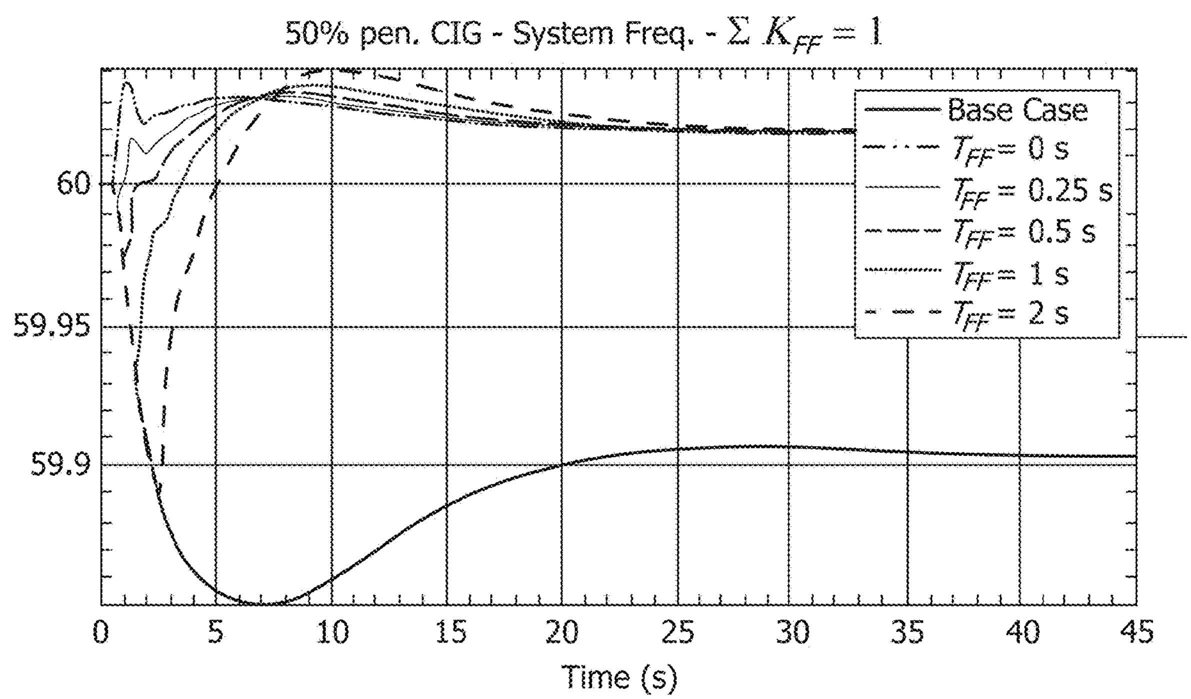
FIG. 5 shows transient response of a power system with a high penetration of renewable generation for the base case as well as several examples of a control method of the disclosed embodiments subject to different actuation latencies.

The improved transient response of a power system with a high penetration of renewable generation is illustrated in FIG. 5. As $\eta$ is increased, the steady state system frequency after the generation drop increases. Note that for the case of $\eta$=1.0, the steady state system frequency is above the nominal frequency. This is a result of reduced losses with distributed generation compared to the losses prior to the fault. In all cases the transient response is significantly improved with the communications enabled feed-forward control of contingency reserves. While communications delays negatively impact the performance, the results are an improvement over the prior art system responses that may be characterized by approximately 2 seconds of delay.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or resequenced according to alternative embodiments.

The present application contemplates methods, systems and program products on any machine-readable media for accomplishing its operations. The embodiments of the present application may be implemented using existing computer processors, or by a special purpose computer processor for an appropriate system, incorporated for this or another purpose or by a hardwired system.

It is important to note that the construction and arrangement of the communication enabled fast-acting imbalance reserve system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. An electrical power transmission network comprising:

at least one primary power generation source connected to the power transmission network for providing primary power to a plurality of loads connected to the power transmission network;

a plurality of secondary generation sources connectable to the power transmission network through power electronics converters devices each of the primary and secondary generation sources comprising a sensor module in data communication with a respective generation source, the sensor configured to sense operating parameters associated with the generation source; and at least one controller in data communication with each of the plurality of sensor modules;

wherein the controller receives sensed operating parameters of the primary and secondary generation sources and in response to detecting an imbalance between a power generation capacity and a connected load resulting in a frequency nadir, communicating a signal within a communication latency to the secondary generation sources and automatically maintaining an updated operational state of the power transmission network in balance by redispatching at least one of the secondary generation sources; and wherein the communication latency is less than the time to the frequency nadir.

2. The power transmission network of claim 1, wherein the power imbalance is detected through direct monitoring of protection schemes in the primary generation source and the secondary generation sources.

3. The power transmission network of claim 1, wherein the controller is further configured to determine an available power level associated with each secondary generation source available to connect to the power transmission network and mitigate the sensed power imbalance.

4. The power transmission network of claim 1, wherein the controller is further configured to initiates communication with each of the redispatching devices associated with the respective secondary generation source as predetermined by the controller in order to the remedy the sensed power imbalance.

5. The power transmission network of claim 1, wherein each of the respective CIGs adjust its power output immediately upon receiving the communication from the controller.

6. The power transmission network of claim 1, wherein the controller is configured to compute the required responsive power level based on the CIGs be operating at reduced load.

7. The power transmission network of claim 1, wherein the controller transmits a power command signal to each CIGs of the CIGs connected to the system in response to receiving a command from the controller to modify a respective power output $\Delta P$ of the respective CIGs according to a predetermined algorithm, wherein the algorithm is:

$$\Delta P_i = K^i_{FF} P_{imb}$$

where $P_{imb}$ is a sensed power imbalance and Pi is an available power level associated with each respective secondary generation source.

8. The power transmission network of claim 1, wherein the controller is configured with a feed-forward algorithm to communication to the CIGs that a power imbalance is sensed, and wherein $K^i_{FF}$ determines the proportion in which each respective secondary generation source participates in response to the sensed power imbalance.

9. The power transmission network of claim 1, wherein a multiplier $K^i_{FF}$ is determined by the proportional power each secondary generation source produces with respect to the total power production of all secondary generation sources.

10. The power transmission network of claim 1, wherein $K^i_{FF}$ is defined by the algorithm:

$$K^i_{FF} = \eta \frac{P_i}{P_{available}}, \text{ with } P_{available} = \sum_{j=1}^{N} P_j$$

wherein η equals the fraction of the power imbalance replaced by the overall system command.

11. A method of controlling a power transmission network, comprising:

monitoring a plurality of power generation resources and load on a power grid;

detecting an imbalance between power generation resources and load connected to the power network;

computing redispatch values associated with the power generation resources connected to the network in response to detecting an imbalance between power generation resources and connected load;

communicating redispatch values to respective power generation resources resulting in a frequency nadir; and monitoring a state of the power generation resources to ensure that the connected power resources have responded to the system redispatch communications;

wherein the communication latency is less than the time to the frequency nadir.

12. The method of claim 11, further comprising: receiving by a controller a plurality of sensed operating parameters of the power generation sources; and communicating a signal to the secondary generation sources and automatically maintaining an updated operational state of the power transmission network in balance by redispatching at least one of the secondary generation sources.

13. The method of claim 11, further comprising:

determining an available power level associated with each secondary generation source available to connect to the power transmission network; and mitigating the sensed power imbalance.

14. The method of claim 11, further comprising: initiating communication with each of the redispatching devices associated with the respective secondary generation source as predetermined by the controller in order to the remedy the sensed power imbalance.

15. The method of claim 11, further comprising: adjusting a power output of each of the respective CIGs in response to receiving the communication from the controller.

16. The method of claim 11, further comprising: transmitting a power command signal to each of the CIGs connected to the system in response to receiving a command from the controller to modify a respective power output ΔP defined as:

$$\Delta P_i = K^i_{FF} P_{imb}$$

where $P_{imb}$ is a sensed power imbalance and Pi is an available power level associated with each respective secondary generation source.

17. The method of claim 11, further comprising:

configuring the controller feed-forward algorithm;

communicating to the CIGs that a power imbalance is sensed, and determining a proportion in which each respective secondary generation source participates in response to the sensed power imbalance.

18. The method of claim 11, further comprising: determining a multiplier $K^i_{FF}$ based on the proportional power each secondary generation source produces with respect to the total power production of all secondary generation sources.

19. The method of claim 11, further comprising: defining $K^i_{FF}$ by:

$$K^i_{FF} = \eta \frac{P_i}{P_{available}}, \text{ with } P_{available} = \sum_{j=1}^{N} P_j$$

wherein η equals the fraction of the power imbalance replaced by the overall system command.

20. A non-transitory computer-readable storage medium having stored thereon instructions which, when executed by one or more processing units, cause the one or more processing units to perform a method of controlling a power transmission network comprising:

monitoring a plurality of power generation resources and load on a power grid;

detecting an imbalance between power generation resources and load connected to the power network;

computing redispatch values associated with the power generation resources connected to the network in response to detecting an imbalance between power generation resources and connected load resulting in a frequency nadir;

communicating redispatch values to respective power generation resources within a communication latency; and monitoring a state of the power generation resources to ensure that the connected power resources have responded to the system redispatch communications;

wherein the communication latency is less than the time to the frequency nadir.

* * * * *